Oct. 21, 1952     W. C. STICKNEY     2,614,578
BUOYANCY TYPE LIQUID METERING DEVICE
Filed Jan. 24, 1951     6 Sheets-Sheet 1

INVENTOR.
WILDER C. STICKNEY
BY G. M. Houghton
his ATTORNEY

Oct. 21, 1952  W. C. STICKNEY  2,614,578
BUOYANCY TYPE LIQUID METERING DEVICE
Filed Jan. 24, 1951  6 Sheets-Sheet 2

INVENTOR.
WILDER C. STICKNEY
BY A. M. Houghton
his ATTORNEY

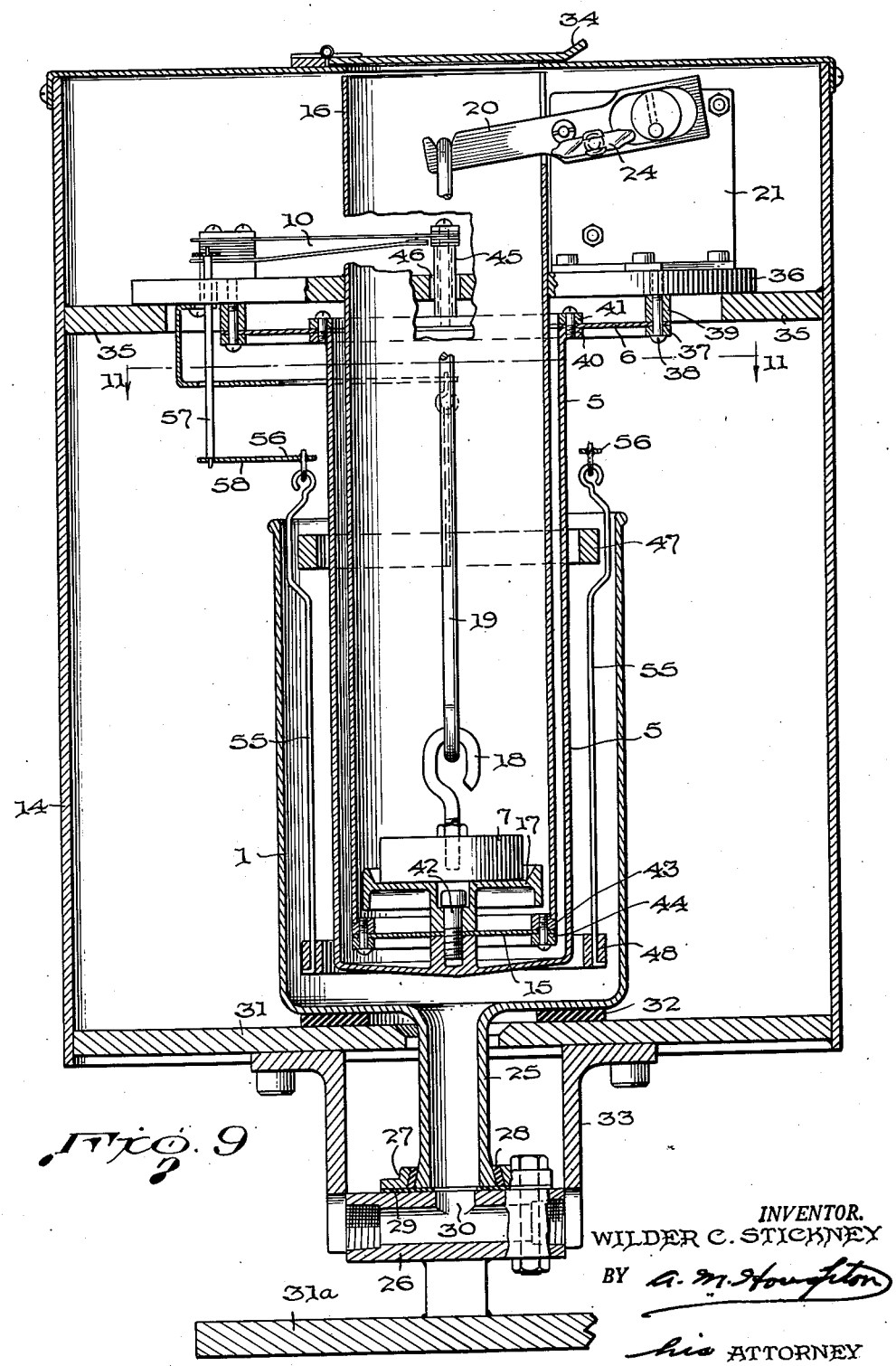

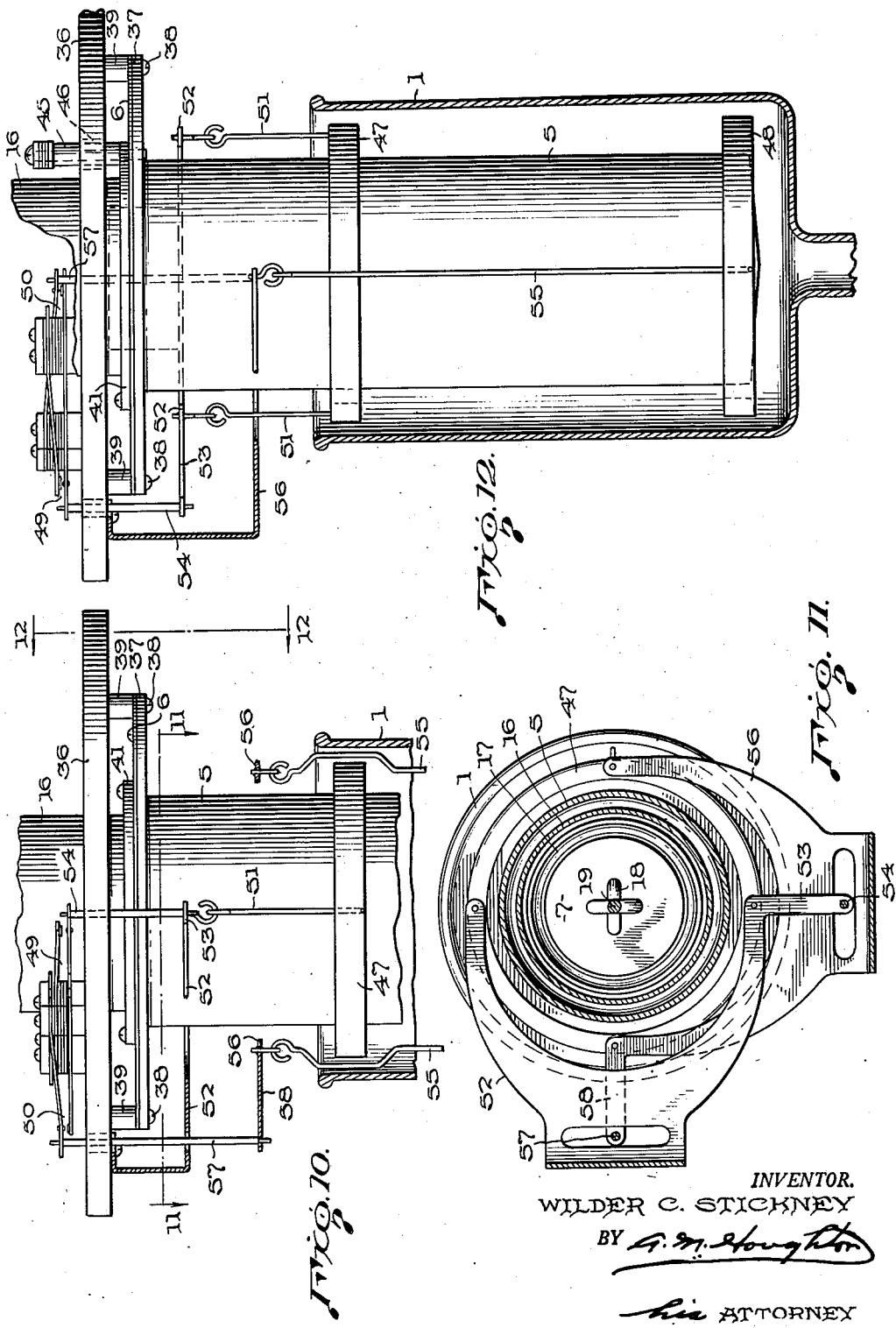

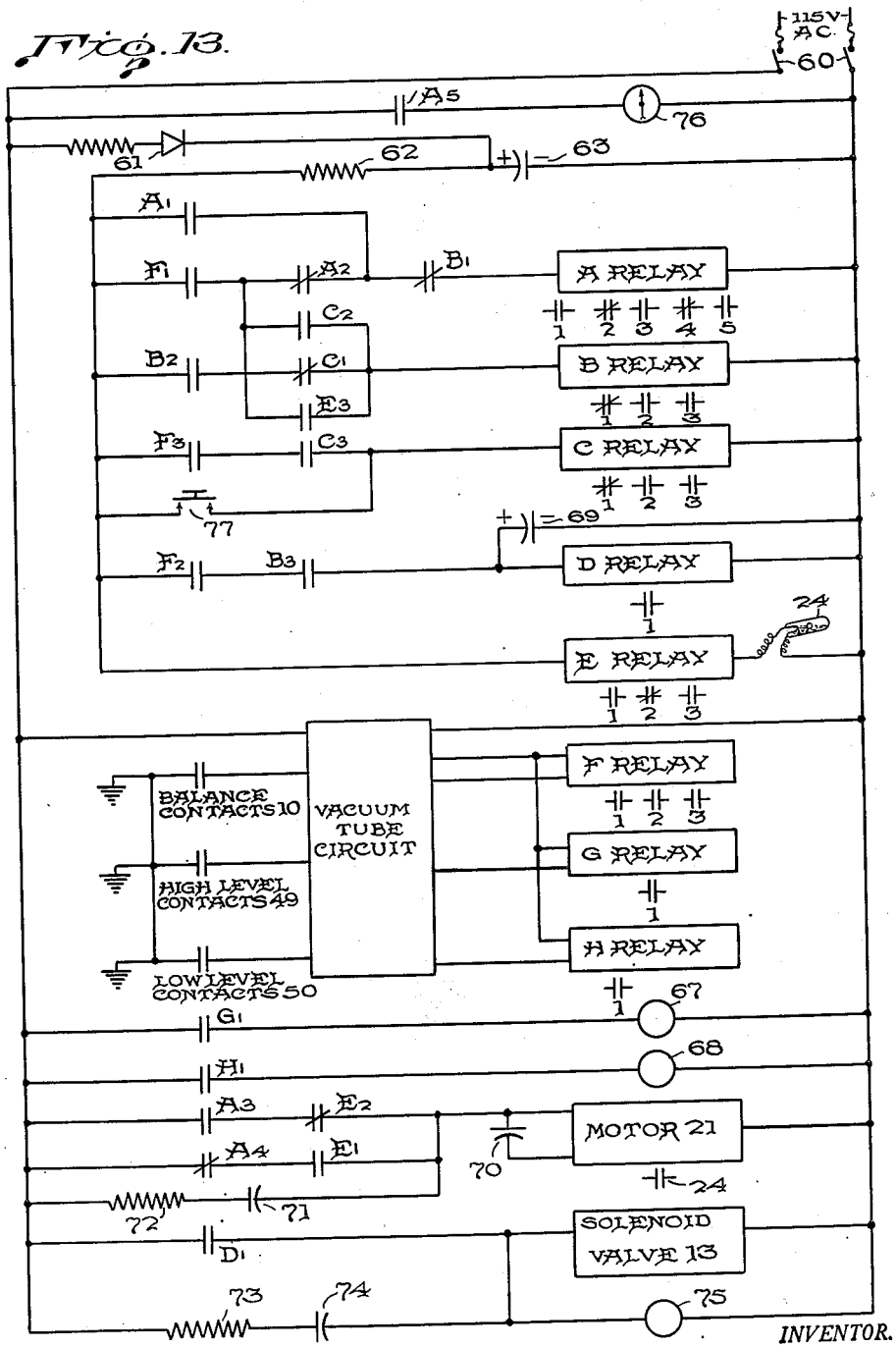

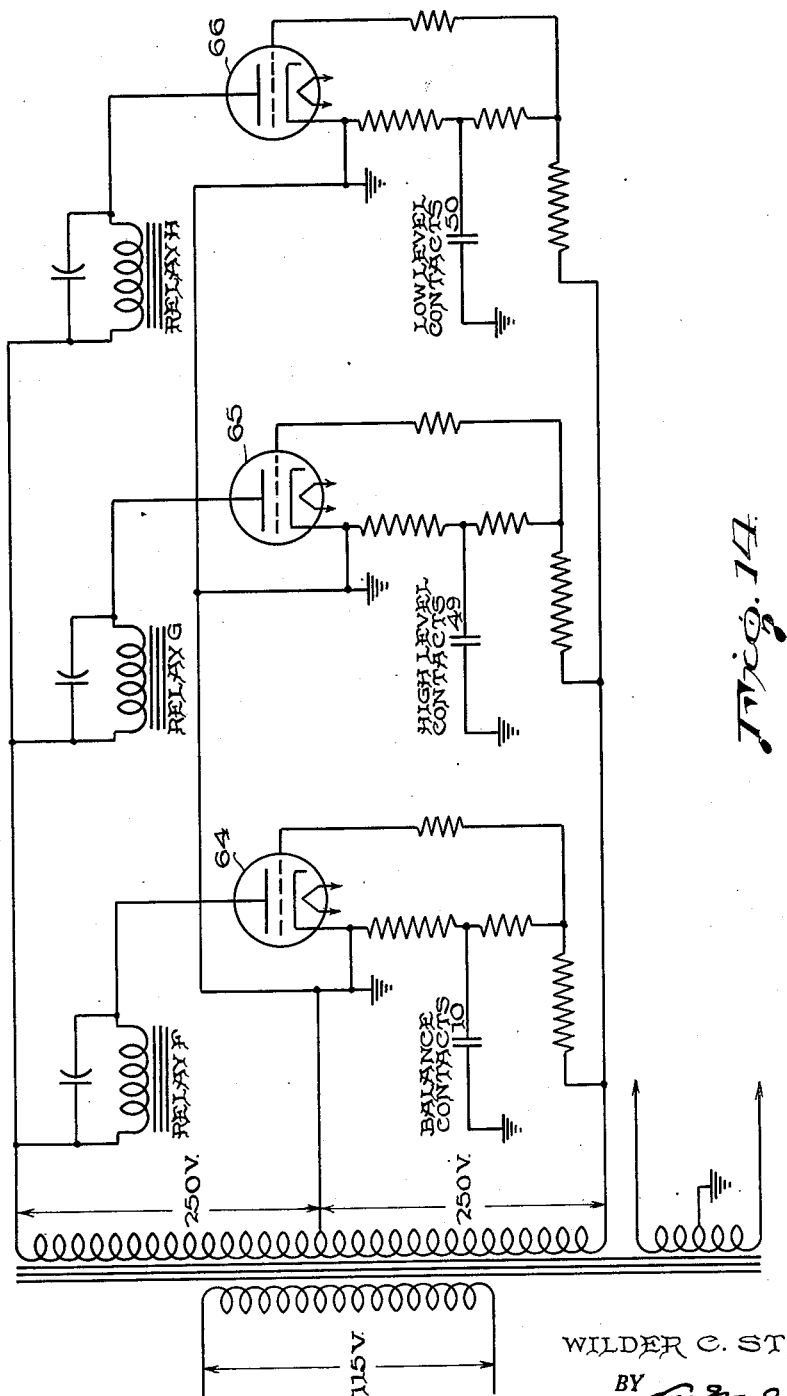

Patented Oct. 21, 1952

2,614,578

UNITED STATES PATENT OFFICE 2,614,578

BUOYANCY TYPE LIQUID METERING DEVICE

Wilder C. Stickney, Penn Township, Allegheny County, Pa., assignor to Gulf Research & Development Company, Pittsburgh, Pa., a corporation of Delaware Application January 24, 1951, Serial No. 207,635

22 Claims. (Cl. 137—391)

This invention relates to a buoyancy type liquid metering device, and more particularly to a metering device which is readily adaptable to weighing and/or dispensing a measured quantity of liquid and to measuring the rate of flow of a moving body of liquid.

Although there are many methods of weighing liquids, the buoyancy weighing method has many distinctive advantages. Among these advantages is the fact that the buoyancy weighing method requires less capacity of weighing device in order to detect a balance, and therefore greater sensitivity is obtained. A further advantage is that the buoyancy method eliminates conventional balance components such as beams, pivots, counter-weights, levers and the like.

The buoyancy method of weighing makes use of a very simple principle long known to the science of physics. Any body immersed in a liquid experiences a certain buoyant force because of the fact that the average upward pressure on the body is greater than the average downward pressure on it. If the buoyant force is equal to the weight of the body, then the body will remain in equilibrium and float about in the liquid. The application of Archimedes' principle to floating bodies establishes the axiom that the weight of the liquid displaced by the floating body is equal to the weight of the body. It is therefore possible to weigh a known quantity of liquid by a very elementary application of this principle; such a device comprises a reservoir filled to the overflow point with liquid, a float in the reservoir freely floating in the liquid, and an overflow or catch-basin to collect the overflow liquid when a known weight is applied to the float. The application of a known weight to the float will then deliver to the overflow a weight of displaced liquid equivalent to the weight applied.

There are, however, disadvantages to such a metering device. For example, the ordinary buoyancy type displacement meter described is not readily adaptable to automatic operation; substantial modification is required. Furthermore, such a device is generally subject to error due to temperature variations during flow which affect the dimensions of the device as well as the density of the liquid being measured, all of which result in errors. In addition, the use of a float which rises and falls substantially with variations in the level of liquid in the reservoir frequently leads to operational difficulties.

It is an object of my invention, therefore, to provide an improved buoyancy type liquid metering device which utilizes the buoyancy principle of metering in a novel manner without the disadvantages which attend prior art devices of similar character. A further object is to provide a buoyancy type liquid metering device which is capable of performing an accurate metering operation without regard to the temperature or pressure at which the measurement is conducted. Another object is to provide a device of the character described having a flexibility that renders it easily adaptable for use in weighing, in the determination of flow rate and/or in dispensing liquids of all descriptions. Still another object of my invention is to provide an improved buoyancy type liquid metering device which is fully automatic, yet safe for use in the metering of inflammable materials.

These and other objects are accomplished by my invention wherein I provide a metering device having a reservoir provided with inlet and outlet means, a float having a limited vertical movement within said reservoir in response to the buoyancy of reservoir liquid, means for temporarily applying a predetermined downward force to said float and means for sensing a given free floating position of said float, both with said force applied at one liquid level and without said force at a lower liquid level. By further providing means for introducing liquid into the reservoir to establish the liquid level therein at a free floating position of the float and for causing the progression of the liquid level to the other free floating position of the float, I thereby meter a predetermined quantity of liquid between the two free floating positions of the float.

My invention may best be understood by reference to the accompanying drawings and the descriptive matter relating thereto. Referring to the drawings, Figs. 1 and 2 are diagrammatic sketches illustrating my invention in its broadest aspect and showing the liquid level in the high and low level positions, respectively;

Fig. 9 is an elevation of the device shown in Fig. 8, taken partly in section along line 9—9 of Fig. 8;

Fig. 10 is an elevation as in Fig. 9, partly in section, showing the high level float structure and the mechanism associated therewith;

Fig. 11 is a section taken along line 11—11 of Fig. 10;

Fig. 12 is an elevation, partly in section, taken along line 12—12 of Figure 10, showing both the high and low level floats and the mechanisms associated therewith;

Fig. 13 is a schematic diagram of the electrical control circuit employed with the preferred embodiment described hereinafter;

Fig. 14 is a schematic diagram of the vacuum tube amplifier circuit employed in the control circuit of Fig. 13.

Figure 1:
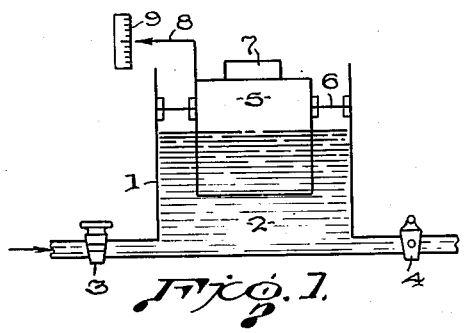
Figure 2:
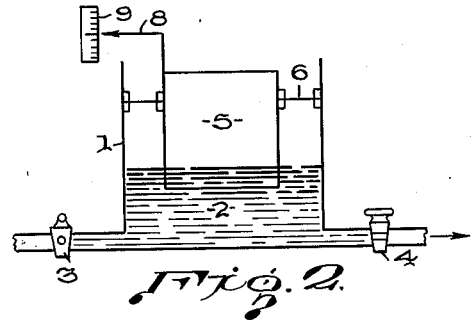

Referring to Figs. 1 and 2 which show the simplest form of my invention, 1 is a reservoir for measuring liquid 2 contained therein and is provided with valves 3 and 4, respectively, in a communicating flow line for admitting and discharging liquid. A float 5 is situated within the reservoir by means of a diaphragm 6 which permits a limited vertical movement of the float in response to the buoyancy of reservoir liquid. The diaphragm, however, does not seal off liquid, but rather permits the liquid to be open to the atmosphere at all times. A weight 7 is provided to temporarily apply a downward force to the float 5 in order to perform a metering operation.

It should be clear that for some particular liquid level, such as the high level shown in Fig. 1, the system will be at equilibrium, such that the combined weight of the float and the applied weight 7 will be exactly counterbalanced by the buoyant force of the liquid 2. This condition may be detected or sensed by means of a pointer 8 which registers on a scale 9 to show the balance point or the point at which the float and applied weight exist in a free floating position. It should also be clear that when weight 7 is removed from the float and liquid is partially discharged from the reservoir, a second balance point will exist when the liquid level has receded to such a point that the weight of float 5 is exactly counterbalanced by the buoyant force of the liquid 2, the float again existing in a free floating position. Such a position, with the liquid at the low level, is shown in Fig. 2. This second balance point also may be sensed by means of pointer 8 and scale 9, and will be precisely at the same point on the scale as when the liquid is in the high level position. Since for any given weight of weight 7 a fixed quantity of liquid will be discharged from the reservoir, it is possible to compute the weight of the liquid discharged and thereby meter out a predetermined quantity of liquid. Of course the device may be calibrated to perform the same function. Thus, starting with an empty reservoir, valve 4 is closed and valve 3 is opened, admitting liquid to the reservoir through the flow line until a high level balance point is reached with the weight 7 applied to the float as in Fig. 1. At this point valve 3 is closed and valve 4 is opened, permitting liquid to discharge from the reservoir until a second or low level balance point is reached with weight 7 removed from the float as in Fig. 2. At this point, a known quantity of liquid will have been discharged from the reservoir and valve 4 may be closed.

It should be apparent that the procedure could be reversed and a metering operation conducted by causing the liquid level to progress from a low level balance point, as in Fig. 2, to a high level balance point, as in Fig. 1. Employing such a procedure, liquid is admitted to the reservoir through valve 4 in the flow line until a low level balance point is reached without application of weight 7 to float 5. Then, by permitting further liquid to enter the reservoir until a high level balance point is reached with weight 7 applied to float 5, a known quantity of liquid will be introduced to the reservoir.

Figures 3, 4:
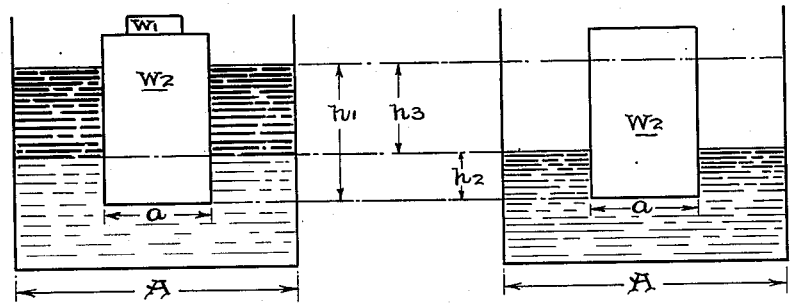
Figs. 3 and 4 are diagrammatic sketches, also showing high and low level positions, illustrating the principle upon which the present invention is based.

Computation of the weight of fluid which is metered between the two balance points may more readily be understood by reference to Figs. 3 and 4 which diagrammatically represent the system at the high and low level balance points respectively. In each figure the float is shown in a free floating position, as it exists at each balance point. The liquid which is metered is equivalent to that quantity of liquid which existed in the locus defined by the annular space between the float and the reservoir wall and by the differential between the high and low level positions of the liquid; this differential volume of liquid is characterized by the shaded area in Fig. 3. Referring to Figs. 3 and 4, $w_1$ = the weight which is alternately applied to the float
$w_2$ = the weight of the float
$W = w_1 + w_2$
$Wm$ = the weight of the liquid being metered
$Vm$ = the volume of the liquid being metered
$A$ = area of the base of the reservoir
$a$ = area of the base of the float
$h_1$ = depth of float immersion with weight $w_1$ applied
$h_2$ = depth of float immersion without weight $w_1$ applied
$h_3$ = differential in depth, or $h_1 - h_2$
$d$ = the density of the liquid being metered.

As stated, the application of Archimedes' principle to floating bodies indicates that the weight of a floating body is equal to the weight of the displaced liquid. Thus, since the weight of this liquid, in the case of Fig. 3, is $h_1 da$ and, in the case of Fig. 4, is $h_2 da$, $$W, \text{ or } w_1 + w_2 = h_1 da$$

and $$w_2 = h_2 da$$

Since $w_1 = W - w_2$ $$w_1 = h_1 da - h_2 da = (h_1 - h_2) da = h_3 da$$

The weight of liquid metered, $Wm = Vmd$, and since $Vm = (h_1 - h_2) A - (h_1 - h_2) a$, or $$Vm = h_3 A - h_3 a$$
$$Wm = h_3 dA - h_3 da$$

Then, since $w_1 = h_3 da$, dividing through by $h_3 da$ gives $$\frac{Wm}{h_3 da} = \frac{h_3 dA - h_3 da}{h_3 da} = \frac{A - a}{a}$$

or $$Wm = w_1 \frac{(A-a)}{a}$$

If the geometry of the system is such that $A=2a$, it is readily seen that the weight of liquid being metered, $W_m$, will equal the weight $w_1$ which is applied to the float for each measurement. It is also readily seen that the measurement is unaffected by any given temperature of measurement, and therefore, it is ordinarily unnecessary to compensate for this temperature by auxiliary equipment or in any calculations. The device of my invention will take a fluid of any density and almost any temperature and deliver an exact weight. It is necessary, however, that the temperature of the liquid during the weighing period be held constant to insure a precise measurement. For all practical purposes, this means that if the fluid is at ambient temperature no correction is necessary. On the other hand, if the temperature of the fluid differs from ambient temperature, then an error proportional to the time of measurement and the temperature difference will appear. This error can be minimized by limiting the metering or weighing period so that the temperature change is negligible. For example, in weighing gasoline it has been found that a minute or two may advantageously be employed without development of significant errors in measurement due to temperature variation. However, under extreme conditions, it may be necessary to add a heat interchanger between the source of fluid and the metering device in order to bring the temperature of the fluid to the ambient temperature and reduce the error due to the temperature drift during weighing. It should also be noted in this connection, that my device may be employed to meter a wide variety of fluids without regard to ordinary changes in barometric pressure, unless extreme accuracy is required. For all practical purposes, however, no correction is necessary for barometric pressure, as long as practical fluids of appropriate density range are being metered.

Figure 5:
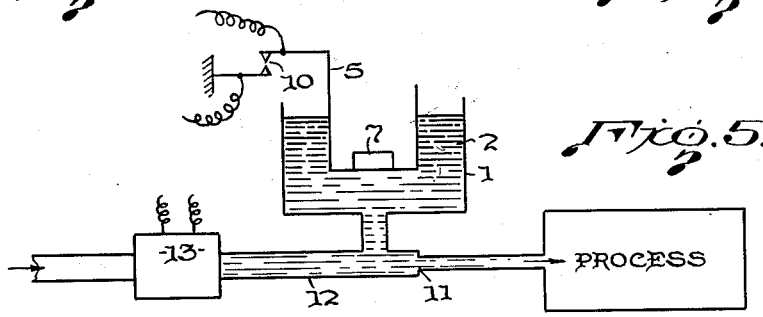
Fig. 5 is a diagrammatic sketch of a preferred embodiment of my invention.

In the preferred embodiment of my invention, as diagrammatically shown in Fig. 5, I provide the above described device with a pair of balance contacts generally indicated at 10 to electrically sense the free floating position of the float 5 which takes the form of a receptacle adapted to receive therein weight 7. In this embodiment, the device is designed to meter the flow into a process and therefore a restriction 11 is provided in the flow line 12 feeding the process and reservoir 1 to insure that liquid will be admitted to the reservoir faster than it can be consumed by the process. Instead of such a restriction, a valve, not shown, could be inserted in the flow line between the reservoir and the process to periodically interrupt the flow and thereby accomplish the same result. As shown in Fig. 5, a solenoid valve 13 is provided to maintain the reservoir in a filled condition and generally control the flow of liquid thereto. An electrically operated control circuit, to be described hereinafter, is provided to automatically operate and control the device. In such a manner, the flow of liquid into a process, which is constantly consuming that liquid, may be metered as the liquid level in reservoir 1 recedes from a high level balance point, with weight 7 applied, to a low level balance point, with weight 7 removed from receptacle 5.

Figure 6:
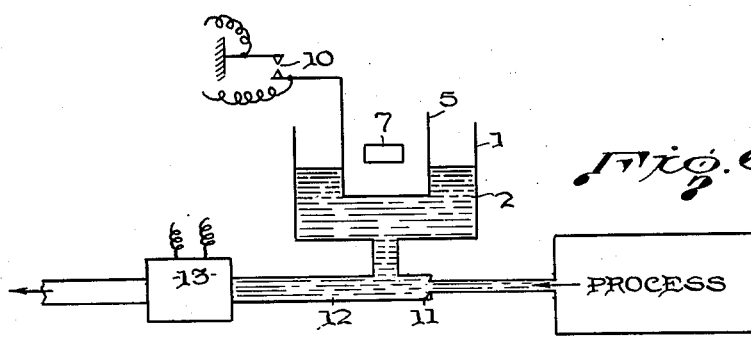
Fig. 6 is a diagrammatic sketch of another embodiment.

By reversing the operation and reversing the position of balance contacts 10, as shown in Fig. 6, the flow of liquid out of a process, which is constantly discharging such liquid, may be metered. In this case, the restriction 11 is placed in the flow line between the process and reservoir 1 so that liquid may be discharged through solenoid valve 13 faster than it enters reservoir 1 when the valve is opened after a metering period. The metering operation is then conducted from a low level balance point, without weight 7 applied to receptacle 5, as shown in Fig. 6, to a high level balance point, with weight 7 applied to the receptacle. Under ordinary conditions the liquid level is maintained approximately at the low level balance point or slightly therebelow by means of the solenoid valve 13 which automatically opens and closes to maintain this level. When it is desired to measure the liquid flowing through line 12, a push button switch is manually closed; this in turn closes solenoid valve 13 and permits the liquid to rise in the reservoir to the low level balance point and thereafter to the high level balance point. These two balance points are detected by balance contacts 10 which, through the control circuit, proceed to indicate either the time for a given weight of liquid which flowed between the two balance points, or the rate of flow of liquid from the process, whichever is desired.

Figure 7:
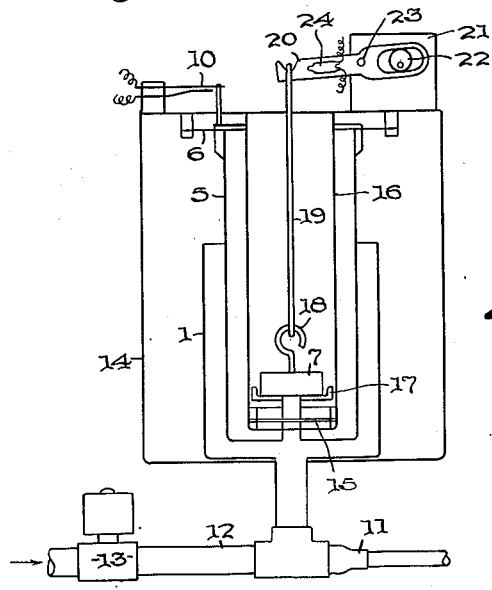
Fig. 7 is a diagrammatic sketch of the preferred embodiment in more detail.

A diagrammatic sketch of the particular embodiment of my invention shown in Fig. 5 is also shown in more detail in Fig. 7. As shown in Fig. 7, the liquid flows through solenoid valve 13 and conduit 12 until it reaches a point where it branches, part of it passing through restriction 11 leading to a process and part of it passing to reservoir 1. Reservoir 1 most conveniently takes the form of a cylinder substantially open at the top and connected at the bottom to conduit 12. A housing 14 is provided to surround the reservoir for purposes of protection and to provide support for mounting further component parts which are suspended above the reservoir. Balance contacts 10 are mounted on this housing. The float 5 also conveniently takes the form of a cylindrical receptacle and is mounted at the top thereof by means of a diaphragm 6 rigidly secured thereto and to the housing 14. The float depends into reservoir 1 and is further guided by a second diaphragm 15 affixed to the base thereof and also secured to a rigid cylindrical member 16 depending from the top of housing 14 within float 5. Inside of member 16 near its base there is provided a plate 17 adapted to receive weight 7 which rests thereon. Weight 7 is provided with an eye 18 adapted to receive a hook on rod 19 which extends into cylinder 16 for the purpose of lowering and elevating weight 7. The top of rod 19 is hooked to an arm 20 which in turn is reciprocated by means of a motor 21 on housing 14, through a cam drive 22 and pivot 23. Arm 20 is provided with a mercury switch 24 adapted to close when the arm and weight are elevated and thereby indicate to the control circuit the position of weight 7.

Figure 8:
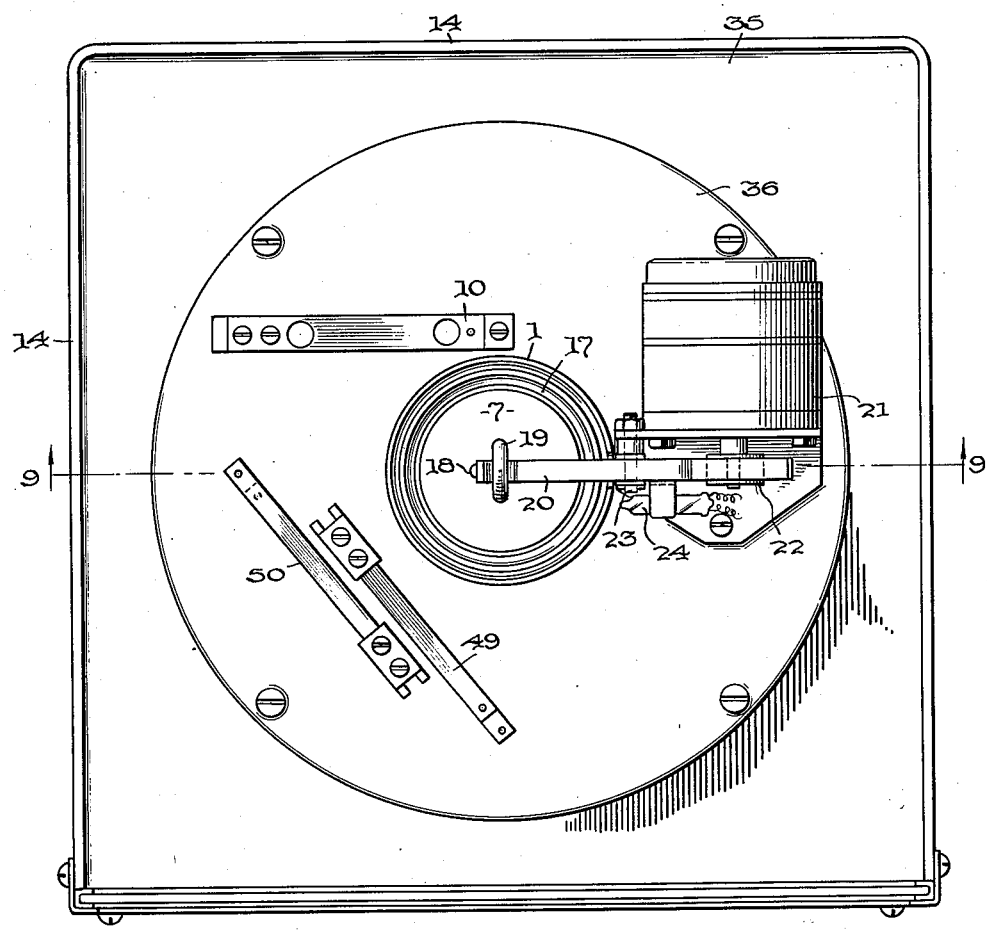
Fig. 8 is a plan view of the preferred embodiment showing the metering device without the complete control mechanism and without the top of the housing.

The mechanical details of this device are more completely set forth in Figs. 8 to 12. Referring to Figs. 8 and 9, it is seen that substantially the same structure is shown as in Fig. 7. Reservoir 1 conveniently takes the form of an inverted bottomless bottle provided with a neck 25 which is rigidly secured to a small threaded pipe 26 by means of an annular ring 27, a packing gland 28 and a gasket 29. Pipe 26 is provided with threads to engage inlet and outlet conduits and with a hole 30 which, together with neck 25 of reservoir 1, effectively forms an inverted T connection. Housing 14 is provided with a base 31 upon which reservoir 1 rests through a shock absorbent ring 32, base 31 being rigidly secured to coupling pipe 26 by means of member 33. The entire unit may also be furnished with supporting legs or a base such as 31a. The top of housing 14 is provided with a hinged lid 34 which permits access to the rigid cylinder 16 depending from the top of housing 14, so that weight 7 may be changed when desired. The inside of housing 14 is provided with a shoulder 35 welded thereto and adapted to receive and support a plate 36 which carries float 5 and other component parts of the device. The upper diaphragm 6, supporting float 5, is rigidly secured at the outer periphery thereof to plate 36 by means of annular ring 37 and bolts 38 secured to plate 36 through bushings 39. The top of float 5 is provided with a flange 40 which receives diaphragm 6, and another annular ring 41 bolted to flange 40, with diaphragm 6 sandwiched therebetween, rigidly secures the diaphragm to the float. A similar arrangement likewise secures diaphragm 15 to the base of float 5 and to the base of cylinder 16. In this case the inner periphery of the diaphragm is sandwiched between the central portion of plate 17 and a central boss within float 5, by means of a bolt 42 running through plate 17 and into the boss. The outer periphery of diaphragm 15 is sandwiched between two annular rings 43 and 44 by means of bolts, ring 43 being rigidly secured to cylinder 16. Thus float 5 is mounted in a semi-rigid condition so that it is free enough to move a slight distance in response to the buoyant force of liquid within reservoir 1, yet secure enough to prevent substantial movement of the float. Advantageously, the distance float 5 is permitted to move may be as little as one sixteenth of an inch, or, just sufficient enough to operate balance contacts 10.

Both motor 21 and balance contacts 19 are rigidly secured to plate 36 and, as hereinafter described, are electrically connected to the control circuit. Balance contacts 19 are opened and closed in accordance with the slight movement of float 5 by means of a pin 45 rigidly secured to the upper balance contact and to flange 40 and ring 41 at the top of float 5. Pin 45 is shown in the broken section in Fig. 9 and in Fig. 12 and passes freely through hole 46 in plate 36. Therefore, as long as the liquid level within reservoir 1 is below a balance point, whether or not weight 7 is applied, balance contacts 19 will remain closed. They will also be closed at the balance point, but when the liquid level is higher than that level which exists at a balance point, balance contacts 19 will open. These indications will be sensed by the electrical control circuit and affect the operation of the device accordingly.

In order to indicate to an operator when the reservoir is full and when the liquid level is low, a high level float 47 and a low level float 48 are suspended within reservoir 1, as shown in Figs. 9, 10 and 12. These floats are operatively connected to high level and low level contacts 49 and 50, respectively, to operate indicator lights in the control circuit and thereby inform the operator of the condition of the reservoir. Both floats take the form of an annular ring of cork or other suitable material and need not float in the literal sense of the word, since the buoyant force of the liquid in the reservoir is sufficient to give a proper indication even though both floats may be completely submerged. High level float 47 is suspended from rods 51 which in turn are secured by means of hooks to an arcuate resilient member 52 rigidly secured and depending from the base of plate 36. One end of member 52 is provided with an arm 53 to which a pin 54 is rigidly secured to transmit motion of the float to high level contacts 49, pin 54 also being rigidly attached to the lower contact of contacts 49. Low level float 48 is similarly suspended from a pair of rods 55 which in turn depend from a second arcuate member 56. Another pin 57 is also rigidly attached to an arm 58 of member 56 and to low level contacts 59. Members 52 and 56, as well as plate 36, are all provided with holes to permit the free vertical movement of pins 54 and 57 so that contacts 49 and 50 will open and close in response to the high and low level conditions of liquid in reservoir 1.

The control circuit previously referred to is shown in Fig. 13. Preferably it is connected to the conventional 110 to 115 volt source of alternating current and is fused and provided with a main switch 60. As may be seen, a system of relays is provided to control the operation of the metering device heretofore described. For convenience each relay is given a designation such as "A relay," "B relay" and the like, and the contact of each relay is designated as "A-1," "A-2" and the like. The contacts for each relay are shown beneath each relay to illustrate the position of each contact in the normal or deenergized condition of the relay, and all contacts in the circuit are shown in the deenergized condition. Since direct current relays are employed herein, a rectifier 61 as well as a filter comprising resistance 62 and condenser 63 are provided to convert the alternating to direct current, and provide relays A, B, C, D and E with a source of power. Since it is desired to be able to employ the metering device with inflammable, as well as non-flammable liquids, for reasons of safety, the balance contacts, as well as the high and low level contacts, are isolated from the higher currents ordinarily employed in relay operation, by means of a vacuum tube amplifier circuit shown in detail in Fig. 14. Balance contacts 19 are thus designed to operate F relay, high level contacts 49 operate G relay and low level contacts 50 operate H relay. Referring to Fig. 14, it is readily seen that if the vacuum tubes are biased at cut-off, no current will flow therethrough and hence the relay in each vacuum tube circuit will not operate. However, as soon as a pair of contacts close, the bias is reduced on the corresponding vacuum tube, permitting conduction through the plate circuit and hence operation of the relay. Thus, closing of balance contacts 19 will result in the conduction through vacuum tube 64 and the energizing of relay F. Similarly, closing of high level contacts 49 will energize relay G, and closing of low level contacts 50 will energize relay H. Relays G and H simply close contacts G-1 and H-1, respectively, when energized, and the only function of these contacts is to operate lights 67 and 68, which simply indicate high and low level conditions. Since these lights do not affect the operation of the remainder of the control circuit, the high level and low level contacts as well as relays G and H may be disregarded.

Relay D, which controls the operation of solenoid valve 13 through contact D-1, is provided with a time delay condenser 69 to delay the deenergization of relay D when solenoid valve 13 is opened to permit a slight excess of liquid to pass therethrough. Motor 21, being of the capacitor type running synchronous with induction start, is provided with a field condenser 70. Another condenser 71 and resistance 72 are also provided across contacts E-1, E-2, A-3 and A-4 to prevent arcing. A similar network consisting of resistance 73 and condenser 74 is provided across contact D-1 to prevent arcing, and light 75 is provided across solenoid valve 13 to indicate when the solenoid valve is energized and the reservoir is filling. A clock 76 is also provided to indicate the time elapsed between the high level and low level balance points during a metering operation. In addition, push button 77 is provided to initiate a weighing or metering cycle which is automatically performed by means of the control circuit.

Broadly stated, the operation of the embodiment specifically described is as follows: It is recalled that the device in this embodiment is placed in the inlet conduit leading to a process which is consuming liquid at a rate controlled by the process. The metering of the gasoline consumption of an internal combustion test engine is illustrative of such an application of my device. As shown in Fig. 5, the liquid will be controlled by solenoid valve 13 which, in the initial stage of operation, maintains a full reservoir in the metering device. The weight 7 is applied to receptacle 5 during this phase of operation. Balance contacts 10 then assure that sufficient liquid will be introduced to the reservoir through valve 13 to refill the reservoir each time the liquid level drops to the high level balance point, thereby closing the balance contacts. Balance contacts 10 control the operation of F relay and, through contact F-2, also control the operation of D relay which must be energized to open solenoid valve 13. The time delay condenser 69 across D relay is provided to insure that a slight excess of liquid will be introduced to the reservoir and thus maintain the liquid level therein slightly above the high level balance point when the device is not performing a metering operation. Thus, as the process constantly consumes the liquid in reservoir 1, causing the liquid level to recede, valve 13 will open periodically to admit more liquid each time the high level balance point is reached.

Assuming a full condition in reservoir 1, push button 77 is then depressed to initiate a metering cycle. This permits the liquid level to recede to the high level balance point as the process consumes more liquid and the relay circuit assures that valve 13 will not open during the metering cycle. As soon as the high level balance point is reached and balance contacts 10 close, the metering cycle begins, weight 7 still being applied to float or receptacle 5. At this point in time a number of events simultaneously occur. The relay circuit causes motor 21 to be energized and thereby elevate weight 7, removing the force of the weight from the float and permitting balance contacts 10 to open. The circuit also causes clock 76 to start so that the time between the high and low level balance points may be observed. Motor 21 will continue to elevate weight 7 until switch 24 on arm 20 of the motor closes, thereby causing the motor to stop. Meanwhile the liquid within the reservoir 1 has continued to recede and will further recede until it reaches a low level balance point, thereby again closing balance contacts 10. When this occurs the timing clock 76 automatically stops due to the action of the control circuit and weight motor 21 again starts to return weight 7 to the float. The control circuit also reopens solenoid valve 13 to permit liquid to refill the reservoir for the next succeeding weighing cycle. In this manner the control circuit shown in Fig. 13 will continue to automatically control operation of the device. A known weight of liquid is thus displaced from reservoir 1 between the time contacts 10 close with weight 7 down and the time contacts 10 close with weight 7 suspended. Flow rate may then be computed from the time it takes a predetermined weight of liquid to pass out of the reservoir. Furthermore, clock 76 may be calibrated for any known weight of weight 7 to indicate directly the flow rate if desired.

The detailed operation of the control circuit is presented hereinafter in outline form for purposes of clarity, since a purely verbal description of its operation is rather difficult to follow. In this outline, four basic phases of operation are set forth. Specifically, they are (I) the reservoir empty and initial energization of the electrical circuits with the filling of the reservoir; (II) maintaining a full reservoir when not weighing or metering; (III) the weighing cycle through operation of the push button 77; and (IV) again maintaining a full reservoir as in (II). An attempt has been made in the outline to set forth the operation of all elements in the appropriate time sequence wherever possible.

I Condition: Reservoir empty. Balance float and weight down and balance contacts closed.
  Operation: Main switch is turned on.
    1. Relay F energized
      $F_1$ closes
        A relay energized ($B_1$, $A_2$ and $F_1$ closed)
          $A_1$ closes (makes before $A_2$ breaks)—Holding contact for A relay
          $A_2$ opens—No immediate effect
          $A_3$ closes—Starts motor 21 to raise weight 7
          $A_4$ opens—No immediate effect
          $A_5$ closes—Timing clock 76 starts but serves no function
      $F_2$ closes—No immediate effect
      $F_3$ closes—No immediate effect
    2. Switch 24 on motor 21 closes when weight 7 elevated.
      E relay energized
        $E_1$ closes—No immediate effect
        $E_2$ opens—Stops motor 21
        $E_3$ closes—B relay energized
          $B_1$ opens—A relay deenergized
            $A_1$ opens—No immediate effect
            $A_2$ closes—No immediate effect
            $A_3$ opens—No immediate effect
            $A_4$ closes—Motor 21 starts to lower weight 7 since $E_1$ closed
            $A_5$ opens—Clock 76 stops
          $B_2$ closes—Holding contact for B relay
          $B_3$ closes—D relay energized
            $D_1$ closes—Valve 13 opens and liquid admitted to reservoir.
    3. Switch 24 on motor 21 opens when weight 7 lowered.
      E relay deenergized
        $E_1$ opens—Motor 21 stopped with weight lowered
        $E_2$ closes—No immediate effect
        $E_3$ opens—No immediate effect
    4. Reservoir becomes filled causing balance contacts 10 to open.
      F relay deenergized
        $F_1$ opens—No immediate effect
        $F_2$ opens—D relay deenergized after time delay due to condenser 69
          $D_1$ opens—Solenoid valve 13 closes
        $F_3$ opens—No immediate effect II Maintaining full reservoir when not weighing
  Condition: Reservoir filled above level required to buoy float and liquid is being withdrawn
    B relay in energized condition
      $B_1$ open (A relay can't operate)
      $B_2$ closed (completes circuit through $C_1$ for B relay)
      $B_3$ closed (completes circuit for D relay when $F_2$ closed)
    1. Balance contacts close when level recedes to balance point with weight down.
      F relay energized
        $F_1$ closes—No immediate effect
        $F_2$ closes—D relay energized
          $D_1$ closes—Solenoid valve 13 opens to admit more liquid
        $F_3$ closes—No immediate effect
    2. Balance contacts open when level rises above balance point with weight down.
      F relay deenergized
        $F_1$ opens—No immediate effect
        $F_2$ opens—D relay deenergized
          $D_1$ opens—Solenoid valve 13 closes
        $F_3$ opens—No immediate effect III Push button weighing cycle
Condition: Reservoir filled above balance point; B relay energized with $B_1$ open, $B_2$ and $B_3$ closed
1. Push button closed
    C relay energized momentarily until push button released
        $C_1$ opens—B relay deenergized
            $B_1$ closes—No effect until $F_1$ closed
            $B_2$ opens—No immediate effect
            $B_3$ opens—D relay and solenoid valve can't operate
        $C_2$ closes—No immediate effect since $F_1$ open
        $C_3$ closes—No immediate effect since $F_3$ open
2. Balance contacts close when liquid recedes to first balance point.
    F relay energized
        $F_1$ closes
            A relay energized since $A_2$ and $B_1$ are closed
                $A_1$ closes (makes before $A_2$ breaks)—Holding contact for A relay
                $A_2$ opens—No immediate effect since $A_1$ is closed
                $A_3$ closes—Weight motor 21 starts to raise weight 7 since $E_2$ is closed
                $A_4$ opens—No immediate effect since $E_1$ open
                $A_5$ closes—Timing clock 76 starts
        $F_2$ closes—No immediate effect since $B_3$ open
        $F_3$ closes—No immediate effect since $C_3$ open
3. Weight elevated by weight motor as liquid recedes
    (a) Balance contacts 10 open
        F relay deenergized
            $F_1$ opens—No immediate effect since $A_1$ holds A relay
            $F_2$ opens—No immediate effect since $B_3$ open
            $F_3$ opens—No immediate effect since $C_3$ open
    (b) Switch 24 closes when weight fully elevated
        E relay energized
            $E_1$ closes—No immediate effect because $A_4$ open
            $E_2$ opens—Cuts off weight motor 21
            $E_3$ closes—No immediate effect until $F_1$ closes
4. Balance contacts 10 close at second balance point with liquid receded
    F relay energized
        $F_1$ closes—Completes circuit through $E_3$ to energize B relay
        $B_1$ opens
            A relay deenergized
                $A_1$ opens—No immediate effect—only holding contact
                $A_2$ closes—No immediate effect since $B_1$ open
                $A_3$ opens—No immediate effect since $E_2$ open
                $A_4$ closes—Weight motor 21 starts since $E_1$ closed
                $A_5$ opens—Timing clock 76 stops
        $B_2$ closes—Keeps B relay energized
        $B_3$ closes—D relay energized since $F_2$ closed $D_1$ closed and solenoid valve 13 opened
        $F_2$ closes—Permits D relay to operate when $B_3$ closed
        $F_3$ closes—No immedate effect since $C_3$ open
5. Weight motor through cam returns weight to float: Switch 24 then opens
    E relay deenergized
        $E_1$ opens—No immediate effect
        $E_2$ closes—No immediate effect since $A_3$ open
        $E_3$ opens—No immediate effect—B relay already energized
6. D relay remains energized until reservoir refilled and balance contacts are again closed.
    F relay deenergized
        $F_1$ opens—No immediate effect
        $F_2$ opens—D relay deenergized after time delay
            $D_1$ opens—Solenoid valve 13 closes
        $F_3$ opens—No immediate effect
IV Reservoir filled and balance contacts maintain in filled condition until next push button cycle.

It should be understood from the above outline that although high and low level indicator lights are furnished, they are dispensable since it is not necessary to know that the reservoir is in a filled condition to initiate a weighing or metering cycle. For example, if the liquid level in reservoir 1 has dropped so that the solenoid valve 13 is admitting liquid, push button 77 may still be employed to start the weighing cycle. This will energize relay C, opening contact $C_1$ and closing contacts $C_2$ and $C_3$. Since balance contacts 10 will be closed, relay F will be energized and thus close contacts $F_1$, $F_2$ and $F_3$. With contact $F_3$ closed, relay C will hold itself through contact $C_3$. Transfer contacts $C_1$ and $C_2$ continue to hold relay B closed through contact $F_1$. As soon as the reservoir is filled, causing the balance contacts to open again, relay F will be deenergized. This will open contacts $F_1$, $F_2$ and $F_3$. Contact $F_1$ releases relay B. Contact $F_2$ deenergizes the relay D circuit and contact $F_3$ deenergizes relay C. Relay D, after a time delay opens contact $D_1$ which in turn opens the solenoid valve circuit. All relays are now deenergized and the weighing cycle as set forth in outline form will automatically be initiated as soon as the level of liquid in reservoir 1 recedes to the high level balance point, closing balance contacts 10.

As has been stated, my invention is not limited to the specific embodiment described for metering into a process, but may also be readily adapted to metering out of a process by an arrangement such as that shown in Fig. 6. In such a case, it is again pointed out that the metering operation would be from a low level balance point with weight 7 suspended to a high level balance point with weight 7 applied to the float. This would require only a slight modification in reversing the balance contacts 10, as in Fig. 6. The only other modification would be reversal of the operation of mercury switch 24 so that motor 21 would suspend weight 7 for the first, or low level, balance point and lower weight 7 for the second, or high level, balance point. Furthermore, by simply providing an addition valve, the device described herein may be easily adapted to perform a dispensing operation. For example, a fully automatic dispensing device would be made by simply replacing clock 76 with another solenoid operated valve. Then under normal conditions liquid would always be retained in the reservoir, but the additional solenoid valve would permit one to dispense a measured quantity of liquid each time the push button were depressed. Of course such a valve could be employed in addition to clock 76 by further obvious modifications.

Further modifications should be apparent to those skilled in the art. For example, the float could take any variety of shapes or forms and an increased sensitivity may be obtained by employing a specially designed float cylinder. The float may also be supported by its own buoyancy or with the aid of a spring or counter-balance, as should be readily understood. In addition many equivalents may be employed in place of the diaphragms for mounting and guiding the float within the reservoir, such as flexure pivots, movable arms, sliding bearings and the like.

In addition to those advantages which attend the use of a buoyancy type meter over other type of meters, as pointed out, my invention has further advantages not to be found in ordinary buoyancy meters. The fact that under ordinary conditions the device is relatively unaffected by temperature and pressure changes should make it readily apparent that my invention has wide utility and greater sensitivity than other devices of a similar type. Furthermore, the utility of the device is greatly enhanced by its flexibility since the basic principle of my invention can be employed to advantage in such a wide variety of applications. Many devices of the same type require flexible connections or siphon tubes but my device may be connected rigidly into a system without such paraphernalia. The reservoir size can also be made to suit various processes over a wide range of capacities and corrosive fluids can be metered by such a device as I have described as long as provision is made to keep corrosive vapors away from the control mechanisms.

My invention is therefore limited only by the scope of the claims hereinafter made.

I claim:

1. A buoyancy type liquid metering device comprising a reservoir and a liquid flow line in communication therewith, a float having a limited vertical movement within said reservoir in response to the buoyancy of reservoir liquid, means for temporarily applying a predetermined downward force to said float, means for sensing a free floating position of said float, both with said force applied at one liquid level and without said force at a lower liquid level, means in the liquid flow line for controlling the accumulation of liquid in said reservoir to establish the liquid level therein at a free floating position of said float and for causing the progression of the liquid level to the other free floating position of said float, whereby the predetermined quantity of liquid between the free floating positions of said float may be metered.

2. A buoyancy type liquid metering device comprising a reservoir and a liquid flow line in communication therewith, a float having a limited vertical movement within said reservoir in response to the buoyancy of reservoir liquid, a weight for temporarily applying a predetermined downward force to said float, means for sensing a free floating position of said float, both with said weight applied at one liquid level and without said weight at a lower liquid level, means operatively controlled by said sensing means for causing the introduction of liquid into said reservoir from said flow line to establish the liquid level in said reservoir at a free floating position of said float and for causing the progression of the liquid level to the other free floating position of said float, whereby the predetermined quantity of liquid between the free floating positions of said float may be metered.

3. A buoyancy type liquid metering device comprising a reservoir provided with inlet and outlet means and a liquid flow line in communication therewith, a float having a limited vertical movement within said reservoir in response to the buoyancy of reservoir liquid, a weight for temporarily applying a predetermined downward force to said float, a pair of electrical contacts operatively controlled by said float for sensing a free floating position of said float, both with said weight applied at one liquid level and without said weight at a lower liquid level, means in said liquid flow line operatively controlled by said contacts for causing the introduction of liquid into said reservoir to a liquid level therein at a free floating position of said float and for causing the progression of the liquid level to the other free floating position of said float, whereby the predetermined quantity of liquid between the free floating positions of said float may be metered.

4. A buoyancy type liquid metering device comprising a reservoir provided with inlet and outlet means and a liquid flow line communicating therewith, a float within said reservoir, diaphragm means between said float and said reservoir giving said float a limited vertical movement within said reservoir in response to the buoyancy of reservoir liquid, a weight for temporarily applying a predetermined downward force to said float and electrical means for actuating said weight, a pair of contacts operatively controlled by said float for sensing a free floating position of said float, both with said weight applied at one liquid level and without said weight at a lower liquid level, means in said liquid flow line operatively controlled by said contacts for causing the introduction of liquid into said reservoir to a liquid level therein at a free floating position of said float and for causing the progression of the liquid level to the other free floating position of said float, whereby the predetermined quantity of liquid between the free floating positions of said float may be metered.

5. A buoyancy type liquid metering device comprising a reservoir provided with inlet and outlet means, a liquid flow line communicating therewith, a receptacle forming a float within said reservoir, diaphragm means between said receptacle and said reservoir giving a limited vertical movement to said receptacle within said reservoir in response to the buoyancy of reservoir liquid, a weight for temporarily applying a predetermined downward force to said receptacle and a motor having a driving connection with said weight for actuating the same, a pair of contacts operatively controlled by said receptacle for sensing a free floating position of said receptacle, both with said weight applied at one liquid level and without said weight at a lower liquid level, means in said liquid flow line operatively controlled by said contacts for causing the introduction of liquid into said reservoir to establish the liquid level therein at a free floating position of said receptacle and for causing a progression of the liquid level to the other free floating position of said receptacle, whereby the predetermined quantity of liquid between the free floating positions of said receptacle may be metered.

6. A buoyancy type liquid metering device comprising a reservoir provided with inlet and outlet means, a liquid flow line communicating therewith, a receptacle forming a float within said reservoir, diaphragm means between said receptacle and said reservoir giving a limited vertical movement to said receptacle within said reservoir in response to the buoyancy of reservoir liquid, a weight for temporarily applying a predetermined downward force to said receptacle and a motor having a driving connection with said weight for actuating the same, a pair of electrical contacts operatively controlled by said receptacle for sensing a free floating position of said receptacle, both with said weight applied at one liquid level and without said weight at a lower liquid level, means in said flow line operatively controlled by said contacts for causing the introduction of liquid into said reservoir to establish a liquid level therein at a free floating position of said receptacle and for causing a progression of the liquid level to the other free floating position of said receptacle, and means responsive to said electrical contacts for performing a function in proportion to the time interval elapsing between the respective free floating positions of said receptacle.

7. A buoyancy type liquid metering device comprising a reservoir and a flow line communicating therewith for the introduction and withdrawal of liquid, a receptacle forming a float within said reservoir, diaphragm means between said receptacle and said reservoir giving a limited vertical movement to said receptacle within said reservoir in response to the buoyancy of reservoir liquid, a weight for temporarily applying a predetermined downward force to said receptacle and a motor having a driving connection with said weight for actuating the same, a pair of electrical contacts operatively controlled by said receptacle for sensing a free floating position of said receptacle, both with said weight applied at one liquid level and without said weight at a lower liquid level, means in said flow line operatively controlled by said contacts for causing the introduction of liquid into said reservoir to establish the liquid level therein at a free floating position of said receptacle and for causing the progression of the liquid level to the other free floating position of said receptacle, and a timing mechanism responsive to said electrical contacts for exhibiting a function in proportion to the time interval elapsing between the respective free floating positions of said receptacle.

8. A buoyancy type liquid metering device comprising a reservoir provided with inlet and outlet means, a valve for regulating the flow through said inlet means, a float having a limited vertical movement within said reservoir in response to the buoyancy of reservoir liquid, means for temporarily applying a predetermined downward force to said float, means for sensing the free floating position of said float as the level of liquid in the reservoir recedes, first with said force applied at one liquid level and again with said force removed at a lower liquid level, means responsive to said sensing means for operating said valve to maintain a body of liquid in said reservoir under static conditions and to interrupt inlet flow during a metering operation.

9. A buoyancy type liquid metering device comprising a reservoir provided with inlet and outlet means, a valve for regulating the flow through said inlet means, a float having a limited vertical movement within said reservoir in response to the buoyancy of reservoir liquid, means for temporarily applying a predetermined downward force to said float, means for sensing the free floating position of said float as the level of liquid in the reservoir recedes, first with said force applied at one liquid level and again with said force removed at a lower liquid level, means responsive to said sensing means for operating said valve to maintain a body of liquid in said reservoir under static conditions and to interrupt inlet flow during a metering operation, and means also responsive to said sensing means for performing a function in proportion to the time interval elapsing as the liquid level recedes between the respective free floating positions of said float.

10. A buoyancy type liquid metering device comprising a reservoir provided with inlet and outlet means, an electrically responsive valve for regulating the flow through said inlet means, a float having a limited vertical movement within said reservoir in response to the buoyancy of reservoir liquid, means for temporarily applying a predetermined downward force to said float, means for electrically sensing the free floating position of said float as the level of liquid in the reservoir recedes, first with said force applied at one liquid level and again without said force at a lower liquid level, means responsive to said electrical sensing means for operating said electrically responsive valve to maintain a body of liquid in said reservoir under static conditions and to interrupt inlet flow during a metering operation.

11. A buoyancy type liquid metering device comprising a reservoir provided with inlet and outlet means, an electrically responsive valve for regulating the flow through said inlet means, a float having a limited vertical movement within said reservoir in response to the buoyancy of reservoir liquid, means for temporarily applying a predetermined downward force to said float, a pair of electrical contacts operatively controlled by said float for sensing the free floating position thereof as the level of liquid in the reservoir recedes, first with said force applied at one liquid level and again with said force removed at a lower liquid level, means responsive to said electrical contacts for operating said electrically responsive valve to maintain a body of liquid in said reservoir under static conditions and to interrupt inlet flow during a metering operation, means also responsive to said electrical contacts for performing a function in proportion to the time interval elapsing as the liquid level recedes between the respective free floating positions of said float, and means for actuating said device to meter a measured quantity of liquid.

12. A buoyancy type liquid metering device comprising a reservoir provided with inlet and outlet means, an electrically responsive valve regulating flow through said inlet means, a float within said reservoir, diaphragm means between said float and said reservoir giving said float a limited vertical movement within said reservoir in response to the buoyancy of reservoir liquid, a weight for temporarily applying a predetermined downward force to said float, a pair of electrical contacts operatively controlled by said float for sensing the free floating positions of said float as the level of liquid in the reservoir recedes, first with said weight applied at one liquid level and again without said weight at a lower liquid level, means responsive to said electrical contacts for operating said electrically responsive valve to maintain a body of liquid in said reservoir under static conditions and to interrupt inlet flow during a metering operation, means also responsive to said electrical contacts for performing a function in proportion to the time interval elapsing as the liquid level recedes between the respective free floating positions of said float, and means for actuating said device to meter a measured quantity of liquid.

13. A buoyancy type liquid metering device comprising a reservoir provided with inlet and outlet means, an electrically responsive valve for regulating the flow through said inlet means, a float within said reservoir and adapted to receive a weight, a diaphragm between said float and said reservoir giving said float a limited vertical movement within said reservoir in response to the buoyancy of reservoir liquid, a motor operated weight for temporarily applying a predetermined downward force to said float, a pair of electrical contacts operatively controlled by said float for sensing the free floating position thereof as the level of liquid in the reservoir recedes, first with said weight applied at one liquid level and again with said weight removed at a lower liquid level, means responsive to said electrical contacts for operating said electrically responsive valve to maintain a body of liquid in said reservoir under static conditions and to interrupt inlet flow during a metering operation, a timing mechanism also responsive to said electrical contacts for exhibiting a function in proportion to the time interval elapsing as the liquid level recedes between the respective free floating positions of said float, and electrical means for actuating said device to meter a measured quantity of liquid.

14. A buoyancy type liquid metering device comprising a reservoir provided with inlet and outlet means, a solenoid valve for regulating the flow through said inlet means, a second solenoid valve in said outlet means, a float within said reservoir and adapted to receive a weight, a diaphragm between said float and said reservoir giving said float a limited vertical movement within said reservoir in response to the buoyancy of reservoir liquid, a motor operated weight for temporarily applying a predetermined downward force to said float, a pair of electrical contacts operatively controlled by said float for sensing the free floating position thereof as the level of liquid in the reservoir recedes, first with said weight applied at one liquid level and again with said weight removed at a lower liquid level, means responsive to said electrical contacts for operating the first said solenoid valve to maintain a body of liquid in said reservoir under static conditions and to interrupt inlet flow during a metering operation, said means also operating said second solenoid valve to dispense a measured quantity of liquid during a metering operation, and electrical means for actuating said device to meter and dispense a measured quantity of liquid.

15. A buoyancy type liquid metering device comprising a reservoir provided with inlet and outlet means, a valve for regulating the flow through said outlet means, a float having a limited vertical movement within said reservoir in response to the buoyancy of reservoir liquid, means for temporarily applying a predetermined downward force to said float, means for sensing the free floating position of said float as the level of liquid in the reservoir rises, first without said force applied at one liquid level and again with said force applied at a higher liquid level, means responsive to said sensing means for operating said valve to maintain a body of liquid in said reservoir under static conditions and to interrupt the outlet flow during a metering operation.

16. A buoyancy type liquid metering device comprising a reservoir provided with inlet and outlet means, an electrically responsive valve for regulating the flow through said outlet means, a float having a limited vertical movement within said reservoir in response to the buoyancy of reservoir liquid, means for temporarily applying a predetermined downward force to said float, means for electrically sensing the free floating position of said float as the level of liquid in the reservoir rises, first without said force applied at one liquid level and again with said force applied at a higher liquid level, means responsive to said sensing means for operating said valve to maintain a body of liquid in said reservoir under static conditions and to interrupt the outlet flow during a metering operation.

17. A buoyancy type liquid metering device comprising a reservoir provided with inlet and outlet means, an electrically responsive valve in said outlet means for regulating the flow therethrough, a float within said reservoir and adapted to receive a weight, a diaphragm between said float and said reservoir giving said float a limited vertical movement within said reservoir in response to the buoyancy of reservoir liquid, a weight for temporarily applying a predetermined downward force to said float, means for electrically sensing the free floating position of said float as the level of liquid in the reservoir rises, first without said force applied at one liquid level and again with said force applied at a higher liquid level, means responsive to said electrical sensing means for operating said electrically responsive valve to maintain a body of liquid in said reservoir under static conditions and to interrupt outlet flow during a metering operation, and means for actuating said device to meter a measured quantity of liquid.

18. A buoyancy type liquid metering device comprising a reservoir provided with inlet and outlet means, a solenoid operated valve for regulating the flow through said outlet means, a float within said reservoir and adapted to receive a weight, a diaphragm between said float and said reservoir giving said float a limited vertical movement within said reservoir in response to the buoyancy of reservoir liquid, a motor operated weight for temporarily applying a predetermined downward force to said float, a pair of electrical contacts operatively controlled by said float for sensing the free floating position of said float as the level of liquid in the reservoir rises, first without said weight applied at one liquid level and again with said weight applied at a higher liquid level, electrical means responsive to said electrical contacts for operating said solenoid valve to maintain a body of liquid in said reservoir under static conditions and to interrupt outlet flow during a metering operation, a timing mechanism operatively controlled by said electrical contacts for exhibiting a function in proportion to the time interval elapsing as the liquid level rises between the respective free floating positions of said float, and means for actuating said device to meter a measured quantity of liquid.

19. A buoyancy type liquid metering device comprising a reservoir provided with a conduit to admit and discharge liquid, a receptacle within said reservoir forming a float therein, a member rigidly secured with respect to said reservoir and depending into said receptacle, a diaphragm between said member and said receptacle giving said receptacle a limited vertical movement within said reservoir in response to the buoyancy of reservoir liquid, a removable weight within said member for applying a downward force to said receptacle, means for applying said weight to said receptacle and for removing the same therefrom, and means for sensing the free floating position of said receptacle both with and without said weight applied as the level of liquid within said reservoir is varied.

20. A buoyancy type liquid metering device comprising a reservoir provided with a conduit to admit and discharge liquid, a receptacle within said reservoir forming a float therein, a member rigidly secured with respect to said reservoir and depending into said receptacle, a diaphragm between said member and said receptacle giving said receptacle a limited vertical movement within said reservoir in response to the buoyancy of reservoir liquid, a removable weight within said member for applying a downward force to said receptacle, a motor having a driving connection with said weight for applying said weight to said receptacle and for removing the same therefrom, and a pair of electrical contacts operatively controlled by movement of said receptacle for sensing the free floating position of said receptacle both with and without said weight applied as the level of liquid within said reservoir is varied.

21. A buoyancy type liquid metering device comprising a reservoir, a flow line communicating therewith and providing an inlet and outlet means therefor, a float having a limited vertical movement within said reservoir in response to the buoyancy of reservoir liquid, means for temporarily applying a predetermined downward force to said float, means for sensing the point at which the total downward force exerted by the float is exactly counterbalanced by the buoyant force of the reservoir liquid, both with said force applied to said float at one liquid level and without said force at a lower liquid level, and means in said flow line for controlling liquid flow and thereby altering the volume of liquid within said reservoir to establish such a point of balance with and without said force applied to said float, whereby the predetermined weight of liquid as defined by the differential volume of liquid between successive points of balance may be metered.

22. A buoyancy type liquid metering device comprising a reservoir, a liquid flow line in communication therewith, a float having a limited vertical movement within said reservoir in response to the buoyancy of reservoir liquid, means for temporarily applying a predetermined downward force to said float, means for sensing a free floating position of said float, both with said force applied at one liquid level and without said force at a lower liquid level, means in said flow line for controlling flow therethrough and thereby causing variations in liquid level within said reservoir, and sensing means for determining the respective free floating positions of said float, whereby the predetermined quantity of liquid between the free floating positions of said float may be metered.

WILDER C. STICKNEY.

REFERENCES CITED

The following references are of record in the file of this patent:

UNITED STATES PATENTS

| Number | Name | Date |
| --- | --- | --- |
| 967,378 | Hillmer | Aug. 16, 1910 |
| 2,352,630 | Griswold | July 4, 1944 |